(12) United States Patent
Mathis

(10) Patent No.: US 6,993,327 B2
(45) Date of Patent: Jan. 31, 2006

(54) MULTICAST DISTRIBUTION OF PRESENCE INFORMATION FOR AN INSTANT MESSAGING SYSTEM

(75) Inventor: James Earl Mathis, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 554 days.

(21) Appl. No.: 10/038,185

(22) Filed: Oct. 29, 2001

(65) Prior Publication Data

US 2003/0083046 A1 May 1, 2003

(51) Int. Cl.
*H04M 3/42* (2006.01)

(52) U.S. Cl. ............................. 455/414.1; 455/412.1; 455/466; 370/390

(58) Field of Classification Search ............... 455/414.1, 455/412.1, 466, 414.2; 370/390, 312, 392, 370/432

See application file for complete search history.

(56) References Cited

U.S. PATENT DOCUMENTS

| | | | | |
|---|---|---|---|---|
| 5,898,679 A | * | 4/1999 | Brederveld et al. ......... | 370/315 |
| 5,974,300 A | | 10/1999 | LaPorta et al. ............ | 340/7.23 |
| 6,141,347 A | | 10/2000 | Shaughnessy et al. | |
| 6,181,697 B1 | * | 1/2001 | Nurenberg et al. ......... | 370/390 |
| 6,188,911 B1 | | 2/2001 | Wallentin et al. | |
| 6,233,235 B1 | | 5/2001 | Burke et al. | |
| 6,611,510 B2 | | 8/2003 | Famolari et al. ............ | 370/335 |
| 6,668,167 B2 | * | 12/2003 | McDowell et al. ......... | 455/433 |
| 6,763,035 B1 | * | 7/2004 | Koskelainen et al. ....... | 370/466 |
| 2001/0009014 A1 | | 7/2001 | Savage, III et al. | |

OTHER PUBLICATIONS

Vicki Johnson, Marjory Johnson, "How IP Multicast Works", www.ipmulticast.com/communicty/whitepapers/howipmcworks.html, 9 pages.

* cited by examiner

*Primary Examiner*—Fan Tsang
*Assistant Examiner*—Simon Sing
(74) *Attorney, Agent, or Firm*—Hisashi D. Watanabe

(57) ABSTRACT

The present invention is a system, method and network (110) for multicast distribution of presence information to a plurality of communication devices (102, 104, 106, 108). A contact list (122, 124, 126, 128), associated with each communication device, identifies one or more of the other communication devices. The network provides one or more multicast addresses based on the contact lists of the communication devices to the plurality of communication devices. The network also sends multicast messages identified by the one or more multicast addresses to the plurality of communication devices. Each multicast address identifies a group of multicast devices among the plurality of communication devices, and the multicast messages include presence information about the group of multicast devices. A portion of the plurality of communication devices receives the multicast messages identified by the one or more multicast addresses and extracts the presence information about the group of multicast devices from the multicast messages.

19 Claims, 3 Drawing Sheets

MULTICAST DISTRIBUTION OF PRESENCE INFORMATION FOR AN INSTANT MESSAGING SYSTEM

FIELD OF THE INVENTION

The present invention relates generally to the field of instant messaging systems and, more particularly, to systems and methods for distributing presence information to a plurality of client devices of an instant messaging system.

BACKGROUND OF THE INVENTION

An instant messaging ("IM") system generally includes a plurality of IM client devices coupled to an IM server or servers of a data network. IM client devices typically provide the ability to track and display the presence status of other users connected to the IM server of the data network. Presence information about other users is organized into contact lists or buddy lists. Each entry in the contact list corresponds to a user of the IM system, or more specifically the user's IM client device, and includes presence information associated with each entry. Users of IM client devices desire up-to-date presence information about the members of their contact list. At a minimum, an IM client device and its associated IM server track whether another device identified by the contact list is the online (e.g., available to communicate) or off-line (e.g., unavailable). Accurate presence information is clearly of value to users, especially when exchanging time-sensitive information.

An IM server is commonly used to update presence information about members of a contact list or buddy list. Unfortunately, such connections between the IM client devices and the associated IM server places significant traffic load on the data network, particularly for a wireless data network. Typically a user's IM client device communicates with the IM server using one-to-one reliable transport mechanism, such as a TCP/IP system. As a result, the aggregate level of system traffic for presence updates is directly proportional to the number of users in the system. This direct scaling relationship is a burden on wireless systems with generally constrained capacity.

Accordingly, there is a need for more efficient mechanisms to distribute presence information to users and their IM client devices. More particularly, there is a need for an instant messaging system that provides updated presence information about members of a contact list or buddy list while minimizing traffic load on a wireless network.

SUMMARY OF THE INVENTION

The present invention is a system for multicast distribution of presence information to a plurality of communication devices. The system includes a plurality of communication devices, a server function, and a network capable of multicast communication with the plurality of communication devices. In the preferred embodiment, the network is capable of wireless communications, though the present invention also works with wired multicast networks. A contact list, associated with each communication device, identifies one or more of the other communication devices. The network provides one or more multicast addresses based on the contact lists of the communication devices to the plurality of communication devices. The network conveys the multicast messages identified by the one or more multicast addresses to the plurality of communication devices. The server function assigns groups of the plurality of communication devices to multicast addresses in a manner to reduce network traffic. Each multicast address identifies a group of multicast devices among the plurality of communication devices, and the multicast messages include presence information about the group of multicast devices. A portion of the plurality of communication devices receives the multicast messages identified by the one or more multicast addresses and extracts the presence information about the group of multicast devices from the multicast messages.

The present invention is also a method for multicast distribution of presence information to a plurality of communication devices. A connection is established between the plurality of communication devices and a network, and the server function accesses a contact list of each communication device. Each contact list is capable of identifying devices of the plurality of communication devices. The server function then generates a multicast address (or more than one multicast address) based on the contact lists of the plurality of communication devices. Each multicast address identifies a group of multicast devices among the plurality of communication devices. Next, the server function provides the multicast address to the plurality of communication devices. Thereafter, the server function sends and the network delivers multicast messages identified by the multicast address to the plurality of communication devices. The multicast messages include presence information about the group of multicast devices and are directed to devices that desire the presence information about the group of multicast devices. The server function can be implemented by a separate device, implemented within the communication network and implemented on at least one of the plurality of communication devices.

DETAILED DESCRIPTION OF THE PREFERRED EMBODIMENT

The present invention uses multicasting techniques to distribute information, including presence information, to locally clustered groups of users with similar contact lists. For example, the contact list information can be used to operate an Instant Messaging ("IM") service or other services based on presence information. The present invention also uses the contact lists to control invocation of group-related services, such as a dispatch call (one to many) and an individual call (one to one).

Instant messaging systems can be considered as having two separate, though coupled, services: a presence service that distributes information on user status, and a transmission service that transmits a message to a particular user. A user may connect to an IM server to establish and download presence information and, then, uses a Short Messaging Service ("SMS") to exchange messages. The present invention is directed to the distribution and use of presence information for instant messaging services.

The present invention enables distribution of presence information to multiple client devices. The system and method of the present invention uses multicast technology to enables a data network or, more particularly, an IM server to send a single copy of a message that includes presence information to multiple client devices that want to receive the presence information. By using multicast technology, the data network or IM server does not need to send an individual copy of the message to each client device or to all nodes on the network which would otherwise burden the traffic load of a data network, particularly a wireless data network.

Figure 1:
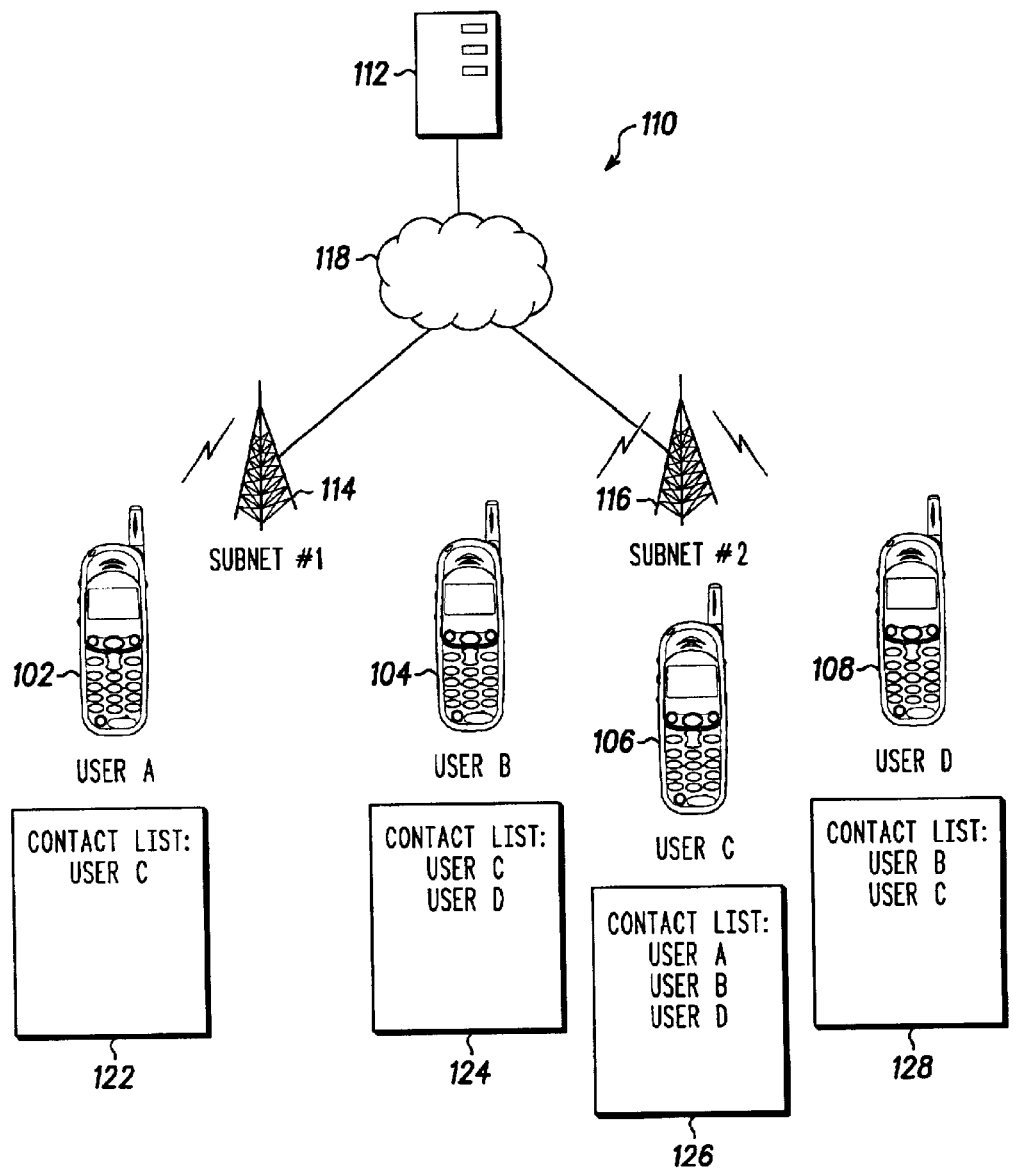
FIG. 1 is a block diagram representing a wireless communication system that may be adapted to operate in accordance with the preferred embodiment of the present invention.

Referring to FIG. 1, the preferred embodiment includes a plurality of client devices 102, 104, 106, 108 associated with a data communication network 110. For purposes of illustration, the communication network 110 includes a single server 112, two radio subnetworks (namely subnetwork #1 114 and subnetwork #2 116), and wireless connectivity 118 between the client devices 102, 104, 106, 108 and the server. It is to be understood that the present invention may also be applied to a different configuration of client devices and a communication network, such as a plurality of servers or connection to a wired network. The client devices 102, 104, 106, 108 and the server 112 each include a processor for general operation of the server and a memory for storage of applications and data.

For the example represented by the preferred embodiment, the four client devices 102, 104, 106, 108 are labeled User A, User B, User C, and User D respectively. User A's client device 102 is on a separate radio subnetwork 114 from the subnetwork 116 of the other client devices 104, 106, 108. User B's, User C's and User D's client devices 104, 106, 108 can receive communications, including multicast transmissions, sent by a base station of subnetwork #2 116 and are on a separate radio subnetwork 114 from User A's client device 102. In practical situations, there will be many more radios, many subnets and larger buddy lists. To increase the bandwidth efficiency of distributing presence information, the server 112 provides each client device 102, 104, 106, 108 with one or more multicast addresses organized to optimally distribute presence update information.

Each client device 102, 104, 106, 108 includes a contact list 122, 124, 126, 128 (a.k.a. a buddy list) that is capable of identifying one or more of the other client devices connected to the communication network 110. Each contact list 122, 124, 126, 128 may identify none of the client devices 102, 104, 106, 108 or at least one of the client devices connected to the communication network 110. A particular client device 102, 104, 106, 108 would include a contact list 122, 124, 126, 128 that identifies other client devices, but the contact list would not identify the particular client device itself. In FIG. 1, the contact lists 122, 124, 126, 128 are shown beneath the client devices 102, 104, 106, 108. However, for the present invention, each contact list 122, 124, 126, 128 is stored in a memory of the respective client device 102, 104, 106, 108, or collectively stored in a memory located in the communication network 110. For the preferred embodiment, the contact lists 122, 124, 126, 128 are stored in a memory of the server 112. The contact lists 122, 124, 126, 128 may also identify a group or collection of users in addition to, or instead of, individual users.

For the preferred embodiment, users of the client devices 102, 104, 106, 108 utilize client software stored by the client devices that offer the ability to track and display the presence status of other users connected to the communication network 110. Each entry of the contact lists 122, 124, 126, 128 corresponds to another user or, more particularly, another client device 102, 104, 106, 108 connected to the communication network 110. Information about the user and/or client device 102, 104, 106, 108 may be associated with each entry including, but not limited to, presence information such as online status (e.g., available to communicate), off-line status (e.g., unavailable), location attribute & capabilities, device attributes & capabilities, communication network attributes & capabilities (e.g., network resource availability). Presence information is generally dynamic in nature, changing over time based on various factors and conditions. Thus, updates to the presence information must be transmitted to relevant client devices 102, 104, 106, 108 to update their respective contact lists 122, 124, 126, 128.

In some environments, a collection of users may have similar, if not identical, contact lists 122, 124, 126, 128. For example, a circle of friends may list each other in their contact lists 122, 124, 126, 128, possibly along with other people. In a work environment, work team members may include each other in their contact lists 122, 124, 126, 128. In some work team environments, the contact lists 122, 124, 126, 128 will be identical amongst all members of the team. In the work environment, work teams may be co-located in close physical and radio-communication proximity, such that a single radio transmission may be received by many, if not all, members of the work team. The physical proximity of work team members would also allow the present invention to be used on a wired network that connects fixed user client devices. Whether wired or wireless, certain types of peer groups are often in physical proximity such that multiple members of a peer group can receive a single transmission.

Figure 2:
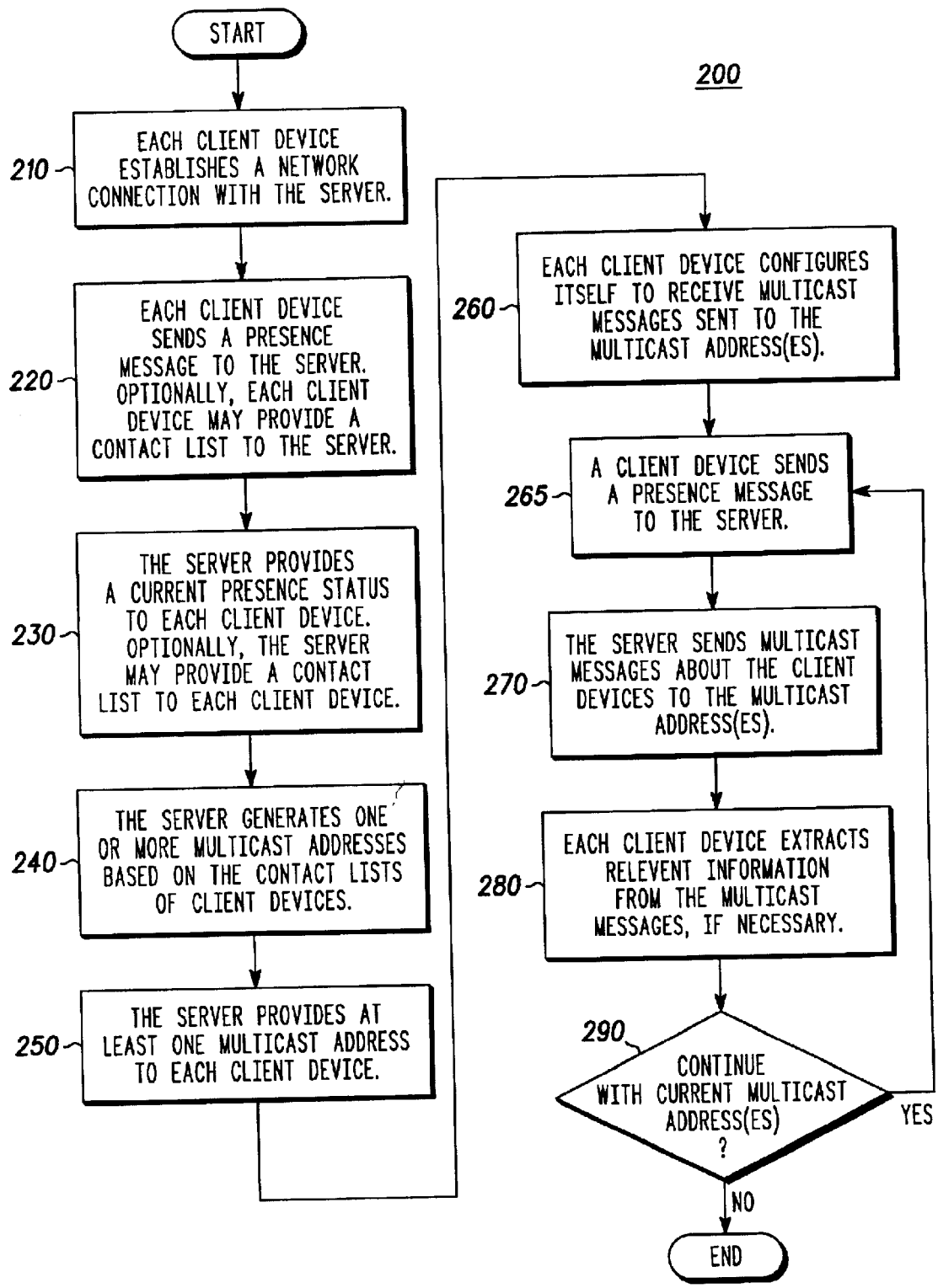
FIG. 2 is a flow diagram representing a method for distributing presence information that may be adapted to operate in accordance with the preferred embodiment of the present invention, such as the system shown in FIG. 1.

Referring to FIG. 2 in combination with FIG. 1, each client device's contact list 122, 124, 126, 128 is centrally stored, controlled, and maintained in the memory of the server 112 for the preferred embodiment. In the alternative, each client device's contact list 122, 124, 126, 128 may be stored, controlled, and maintained in the memory of each respective client device 102, 104, 106, 108. After each user's client device 102, 104, 106, 108 powers-on, resets, initializes, connects to a wired network, comes in range of a wireless system or otherwise needs to begin service, each client device establishes a network connection with the communication network 110 by contacting the server 112 via a subnetwork 114, 116 and wireless connectivity 118 at step 210.

Upon contacting the server 112, each client device 102, 104, 106, 108 sends a presence message to the server 112 at step 220 and, then, the server provides a current presence status to each client device at step 230. The presence information includes, but is not limited to, online status (e.g., available to communicate), off-line status (e.g., unavailable), location attribute & capabilities, device attributes & capabilities, communication network attributes & capabilities (e.g., network resource availability). For the preferred embodiment, each client device 102, 104, 106, 108 provides an online status to the server 112 to indicate that it is available to communicate. Thus, the server 112 will have presence information from the client devices 102, 104, 106, 108 collectively and may store the collective presence information in its memory. Each client device 102, 104, 106, 108 receives the presence status of the other client devices connected to the network 110 so that the client device may update its respective contact list 122, 124, 126, 128 with such information. Of course, the multicasting technique of the present invention may be used to disseminate the present status. However, for the preferred embodiment, the server 112 provides the initial presence status of the client devices 102, 104, 106, 108 to each client device, and the multicasting technique is subsequently used by the server to provide updates to the presence status. Accordingly, the server 112 and the client devices 102, 104, 106, 108 have shared client list information, and the client devices are ready to optimally, or near optimally, receive presence updates sent via a multicast technique.

As stated above, each contact list 122, 124, 126, 128 may be stored in a memory of the respective client device 102, 104, 106, 108, or collectively stored in a memory located in the communication network 110, such as the server 112. In a situation where the contact lists 122, 124, 126, 128 are stored in the client devices 102, 104, 106, 108, each client device may provide its client list along with the presence message to the server 112 at step 220. In a situation where the contact lists 122, 124, 126, 128 are stored in the server 112, the server may provide to each client device 102, 104, 106, 108 the respective contact list along with the current presence status at step 230.

Next, the server 112 generates one or more multicast addresses based on the contact lists 122, 124, 126, 128 of the client devices 102, 104, 106, 108 at step 240. The Server 112 provides one or more multicast addresses to each client device 102, 104, 106, 108 at Step 250. Each multicast address represents a destination identification to which presence updates for the contact lists 122, 124, 126, 128 will be multicast. A set of contact list entry identifiers is associated with each multicast address. Upon receiving one or more multicast addresses, each client device 102, 104, 106, 108 performs actions necessary, i.e., configures itself, to receive multicast traffic sent to these multicast addresses at Step 260. The preferred embodiment is based on IP Multicast and, thus, each client device 102, 104, 106, 108 sends an Internet Group Management Protocol ("IGMP") Join message to the first-hop router.

Once the client devices 102, 104, 106, 108 and server 112 complete the initialization and configuration steps 210 through 260, the server 112 multicasts presence information update messages as appropriate. In Step 265, update messages are sent to the server 112 when there is a change in the value of the presence information for client devices 102, 104, 106 and 108, and at other times based on various factors and conditions. In Step 270, the server 112 sends multicast messages about the client devices to the multicast addresses when there is a change in value of the presence information and at other times based on various factors and conditions. In Step 280, client devices receiving the multicast messages extract relevant information from the multicast messages to update entries in their contact list.

Finally, in step 290, the server 112 determines whether to continue with the current multicast address or current set of multicast addresses. If so, then the client devices 102, 104, 106, 108 and the server 112 repeat steps 265 through 280 as described above. Otherwise, the server 112 may terminate the current session of multicast distribution, or generate one or more new multicast addresses and repeat steps 250 through 280.

Figure 3:
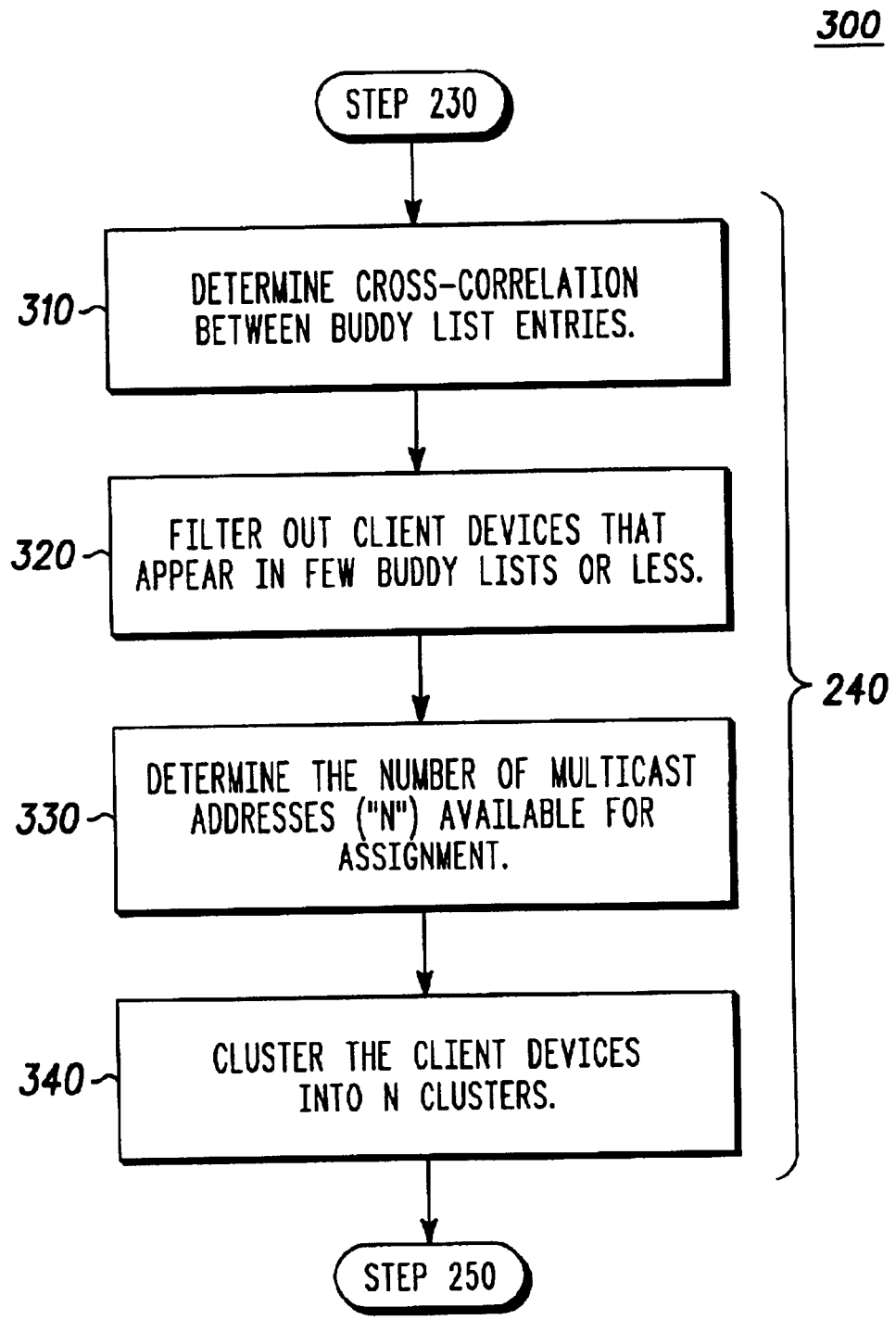
FIG. 3 is a flow diagram representing a method for generating multicast addresses that may be adapted to operate in accordance with the method for distributing presence information, such as the method shown in FIG. 2.

Referring to FIG. 3, in the preferred embodiment, the computation to assign user presence updates to groups of multicast devices is performed as a background maintenance activity and updated periodically based on a particular time period since a previous computation. In an alternative embodiment, the computation to assign user presence updates to groups of multicast devices is performed in response to user registrations and cell-site changes in which location as an additional factor to consider.

In the simple situations of client devices 102, 104, 106, 108 with identical contact lists 122, 124, 126, 128, such as work teams, assignment of a multicast group address is straightforward. Such assignment could be performed manually in a manner similar to assignment of users to voice dispatch talk groups. In such situations, the multicast address could be used to define the contact list of a client device, allowing a user to easily switch between contact lists defined by a system administrator and controlled by the server 112.

In situations of client devices 102, 104, 106, 108 with partially overlapping contact lists 122, 124, 126, 128, a more complex procedure is needed. In the preferred embodiment, the procedure to make the multicast address assignments, i.e., the procedure of step 240, is a four-step process as follows:

(1) Determine cross-correlation between contact list entries; client device pairs with high cross-correlation are frequently encounter together in a contact list 122, 124, 126, 128 at step 310.

(2) Filter out client devices 102, 104, 106, 108 that appear in zero, one or few contact lists; distribution by means of individually addressed updates is efficient at step 320.

(3) Determine the number of multicast addresses "N" available for assignment at step 330. This may be a manually set configuration parameter.

(4) Cluster the user devices into "N" clusters to correspond with the number of available multicast addresses at step 340.

In step 310 above, the server 112 may use a wide variety of mathematical techniques to determine cross-correlation between client devices 102, 104, 106, 108. This correlation indicates how likely two users will be in the same contact list 122, 124, 126, 128. Strongly correlated users are an indication of where a single multicast communication will efficiently distribute the presence update and reduce traffic over the situation of sending individually addressed presence updates to client devices 102, 104, 106, 108. The most appropriate or computationally acceptable cross-correlation technique will depend on a variety of factors, including the number of users.

For the preferred embodiment represented by FIG. 1, an approach using an array holding usage counts may be used. For this system, each contact list 122, 124, 126, 128 is scanned to determine the percentage of references where one user is present and another user is also present. For example, in FIG. 1, whenever a contact list 122, 124, 126, 128 contains an entry for User A, there is always an entry for User B; this is a cross-correlation factor of 1.0. Table 1 below provides the cross-correlation factors for all four users.

TABLE 1

|        | User A | User B | User C | User D |
|--------|--------|--------|--------|--------|
| User A |        | 1.0    | 0      | 1.0    |
| User B | 0.5    |        | 0.5    | 0.5    |
| User C | 0      | 0.3    |        | 0.3    |
| User D | 0.5    | 0.5    | 0.5    |        |

In step 320 above, any client device 102, 104, 106, 108 where use of a multicast technique would be less efficient than sending an individually addressed presence update is removed from assignment to a multicast address. In general, this is any client device 102, 104, 106, 108 with zero, or one or a small number of low correlation factors. For the preferred embodiment represented by FIG. 1, we do not exclude any users from assignment to a multicast group address.

In step 330 above, the maximum number of multicast addresses available for assignment is determined. For the preferred embodiment, this determination is a configuration item. In particular, the maximum number of multicast addresses is set to be two (2).

In step 340 above, the users are clustered into groups of multicast devices of similar cross-correlation as shown by Table 2 below.

TABLE 2

|        | User A | User B | User D | User C |
|--------|--------|--------|--------|--------|
| User A |        | 1.0    | 1.0    | 0      |
| User B | 1.0    |        | 0.5    | 0.5    |
| User D | 0.5    | 0.5    |        | 0.5    |
| User C | 0      | 0.3    | 0.3    |        |

The final assignment of user devices to multicast group addresses for the preferred embodiment represented by FIG. 1 shown below by Table 3.

TABLE 3

| Multicast Address #1 | Multicast Address #2 |
|----------------------|----------------------|
| User A               | User C               |
| User B               |                      |
| User D               |                      |

The assignment procedure of step 240 may be repeated when changes are made to contact list membership. In the alternative, the number of multicast addresses may be reduced to be below the configured maximum if there are few, highly cross-correlated groupings. This procedure would consider the expected traffic impact of combining groups.

Existing user presence update systems use one-to-one connections to exchange presence updates between client devices 102, 104, 106, 108 and the server 112. For example, if five users have a contact list entry for User A, then when User A goes on-line, five independent information exchanges are conducted between the client devices 102, 104, 106, 108 and the server 112. These exchanges will involve at least one packet transmission each and typically many more. If these five users are physically co-located within radio transmission range of the same base station, five or more wireless packets will be sent while one packet is needed in the optimal case.

For smaller systems, each user may be associated with a unique multicast address for distributing presence updates. However, multiple users are preferably associated with each multicast address due to practical constraints on the number of multicast groups efficiently supported by routers and a potentially large number of users. The present invention provides a means to cluster a number of users into groups of multicast devices and assign these groups to a particular number "N" of multicast addresses. The presence distribution system and method of the present invention substantially reduces the over-the-air traffic for presence updates in certain conditions commonly found in peer group environments. By using a multicast technique, multiple users connected to the same wired multicast network or within range of the same wireless base station can simultaneously receive the same packet. Beyond immediate application to wide-area work-team environments, the present invention can also be used with short-range wireless LAN systems supporting departments, classes or other peer groups.

In an alternate embodiment, the server functions performed by server 112 in FIG. 1 are distributed amongst the plurality of client devices. In this alternate embodiment, one or more multicast addresses based on the contact lists of the communication devices to the plurality of communication devices are defined in the same manner as in the preferred embodiment. Client devices 102, 104, 106, 108 do not send presence updates to server 112 for redistribution to the plurality of client devices, rather each client device 102, 104, 106, 108 sends their presence updates directly to other client devices 102, 104, 106, 108 using the assigned multicast address.

While the preferred embodiment of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A system for multicast distribution of presence information to a plurality of communication devices comprising:
   a plurality of communication devices, each communication device associated with a contact list that identifies at least one of the other communication devices; and
   a network capable of multicast communication with the plurality of communication devices, the network being effective to generate at least one multicast address based on the contact lists of the plurality of communication devices by determining a cross-correlation between entries of the contact lists and filtering out less prominent communication devices to create a list of possible candidates, provide the at least one multicast address to the plurality of communication devices, and convey multicast messages identified by the at least one multicast address to the plurality of communication devices, each multicast address identifying a group of multicast devices among the plurality of communication devices, the multicast messages including presence information about the group of multicast devices,
   wherein a portion of the plurality of communication devices receives the multicast messages identified by the at least one multicast address and extracts the presence information about the group of multicast devices from the multicast messages.

2. The system of claim 1, wherein the network provides a presence status to each communication device.

3. The system of claim 1, wherein each device of the group of multicast devices is configured to receive the multicast messages identified by the at least one multicast address.

4. The system of claim 1, wherein the communication devices store the contact lists and provide the contact lists to the network.

5. The system of claim 1, wherein the network stores the contact lists of the plurality of communication devices and provides the contact lists to the plurality of communication devices.

6. The system of claim 1, wherein the network generates the at least one multicast address by identifying more prominent devices of the plurality of communication devices.

7. The system of claim 1, wherein the network generates the at least one multicast address by selecting the contact lists that identify similar communication devices.

8. The system of claim 1, wherein the portion of the plurality of communication devices has contact lists corresponding to members of the group of multicast devices.

9. A method for multicast distribution of presence information to a plurality of communication devices, the method comprising the steps of:

establishing a network connection between the plurality of communication devices and a network;

accessing a contact list of each communication device by the network, each contact list being capable of identifying devices of the plurality of communication devices;

generating, at the network, at least one multicast address based on the contact lists of the plurality of communication devices by determining a cross-correlation between entries of the contact lists and filtering out less prominent communication devices to create a list of possible candidates, each multicast address identifying a group of multicast devices among the plurality of communication devices;

providing the at least one multicast address from the network to the plurality of communication devices; and delivering multicast messages identified by the at least one multicast address to the plurality of communication devices by the network, the multicast messages including presence information about the group of multicast devices and being directed to devices that desire the presence information about the group of multicast devices.

10. The method of claim 9, further comprising the step of providing a presence status from the network to each communication device.

11. The method of claim 9, further comprising the step of configuring a portion of the plurality of communication devices to receive the multicast messages identified by the at least one multicast address.

12. The method of claim 9, further comprising the steps of:

storing each contact list at each communication device; and providing the contact lists from the plurality of communication devices to the network.

13. The method of claim 9, further comprising the steps of:

storing the contact lists of the plurality of communication devices at the network; and providing the contact lists from the network to the plurality of communication devices.

14. The method of claim 9, wherein the step of generating including the steps of:

selecting similar contact lists identifying similar communication devices; and creating the at least one multicast address based on the similar contact lists.

15. The method of claim 9, wherein the multicast messages are directed to devices that have contact lists corresponding to members of the group of multicast devices.

16. The method of claim 9, wherein the step of generating further includes the step of determining a number of multicast addresses ("N") available for assignment.

17. The method of claim 16, wherein the step of generating further includes the step of clustering at least two communication devices on a list of possible candidates to form N cluster(s) of multicast addresses.

18. The system of claim 1, wherein the network is further effective to determine a number of multicast addresses ("N") available for assignment.

19. The system of claim 18, wherein the network is further effective to cluster at least two communication devices on a list of possible candidates to form N cluster(s) of multicast addresses.

* * * * *